United States Patent [19]
Tabei et al.

[11] Patent Number: 5,929,863
[45] Date of Patent: Jul. 27, 1999

[54] RECORD EXTRACTION METHOD AND APPARATUS IN DATA PROCESSOR AND RECORDING MEDIUM RECORDING PROGRAMS OF THE RECORD EXTRACTION METHOD

[75] Inventors: Takashi Tabei; Tsunemi Mochizuki, both of Akishima; Yoshiaki Yuyama, Hachioji; Hisao Aihara, Yamanashi-ken, all of Japan

[73] Assignee: Casio Computer Co., Ltd., Tokyo, Japan

[21] Appl. No.: 08/626,077

[22] Filed: Apr. 1, 1996

[30] Foreign Application Priority Data

Jun. 20, 1995 [JP] Japan .................................. 7-178142
Nov. 30, 1995 [JP] Japan .................................. 7-338086

[51] Int. Cl.$^6$ .................................................. G06T 11/00
[52] U.S. Cl. ............................................................ 345/440
[58] Field of Search ........................... 395/140, 774–778, 395/326, 334, 335, 338, 349–351, 355–357; 345/440, 326, 334, 335, 338, 348–351, 355–357; 707/1–6, 513–516

[56] References Cited

U.S. PATENT DOCUMENTS 5,301,315  4/1994  Pellicano .................................. 395/600
5,398,338  3/1995  Yoshida .................................... 395/600
5,557,716  9/1996  Oka et al. ................................ 395/140
5,608,899  3/1997  Li et al. ....................................... 707/4

FOREIGN PATENT DOCUMENTS 0 490 625 A3   6/1994   European Pat. Off. .
0 627 692 A1  12/1994   European Pat. Off. .
7-105391       4/1995   Japan .

OTHER PUBLICATIONS

IBM Technical Disclosure Bulletin, vol. 30, No. 3, Aug. 1987, New York, U.S., pp. 1350–1351, XP002015495, Anonymous: "Graphics Query System".

*Primary Examiner*—Almis R. Jankus
*Attorney, Agent, or Firm*—Frishauf, Holtz, Goodman, Langer & Chick

[57] ABSTRACT

In performing record retrieval processing, a record retrieval processor forms a two-dimensional distribution graph from a plurality of records stored in a record file on the basis of designated items on the x- and y-axes and displays the distribution graph on a display unit. When a retrieval range is designated on the displayed distribution graph, the record retrieval processor retrieves records within the designated range, reads out records on the basis of key codes of the retrieved records corresponding to the items, and displays the readout records on the display unit.

3 Claims, 11 Drawing Sheets

DISTRIBUTION GRAPH

FIG.5

CONDITION 1 & CONDITION 2

GRAPH DISPLAY DATA

| MERCHANDISE CODE | SALES (1,000YEN) | GROSS MARGIN | INVENTORY AMOUNT | INVENTORY TURNOVER |
|---|---|---|---|---|
| 10001 | 928 | 76.2 | 120 | 7.7 |
| 10002 | 89 | 20.1 | 22 | 4.0 |
| 10020 | 555 | 11.5 | 220 | 2.5 |
| 21110 | 736 | 58.3 | 56 | 13.1 |

FIG.12 ns, a record retrieval method, a record extraction method, and a record extraction apparatus and, more particularly, to a record retrieval method, a record extraction method, and a record extraction apparatus for retrieving a record meeting designated conditions from a plurality of records in a data processor.

2. Description of the Related Art

In conventional data retrieval processing used in computer systems and the like, a general method of designating a retrieval condition on which records stored in, e.g., a large-capacity external storage device and consisting of a plurality of fields are retrieved is to directly input (including selection of a list using a sub-window) a code as the key of the retrieval condition or to directly input a condition (range) with respect to a specific item on a file.

In this retrieval condition input method used in the conventional data retrieval processing, however, a code serving as the key of a retrieval condition is directly input (including selection of a list using a sub-window) or a condition (range) with respect to a specific item on a file is directly input. Accordingly, the method has the following problems.

That is, to retrieve a file under a certain condition in the above retrieval condition input method, it is necessary to predetermine the retrieval condition or to know the key code meeting the retrieval condition in advance. To find the range of the retrieval condition and obtain the key code within the range by using a method of trend analysis, it is necessary to recognize the overall trend, determine the range of the condition to be obtained, retrieve a file within the range of the condition, confirm the retrieval result, and obtain an appropriate key code by trial and error. Since a number of these processing steps are necessary, the procedure is cumbersome and time-consuming. Additionally, discontinuity of the work results in a low work efficiency.

Also, in conventional database systems used in enterprises and the like, various records are stored in a database and the data amount is huge. Accordingly, to extract necessary records from the database, it is necessary to ask an operator having expert knowledge on the database or to perform troublesome operations at a system terminal managing the database. That is, in such an operation environment, not all users can readily perform extraction of records, and this lowers the availability of the database.

SUMMARY OF THE INVENTION

It is an object of the present invention to provide a record retrieval method, a record extraction method, and a record extraction apparatus in which a distribution graph is displayed in the form of a graphic image on the basis of records to be retrieved, a desired range is designated on the displayed distribution graph, data in the designated range is retrieved, and a retrieval condition input operation in retrieval of the records by trend analysis is simplified.

The present invention provides a record extraction method of extracting a desired record from a plurality of stored records, comprising the steps of displaying a first graph based on the record by using designated record items as graph axes, designating a region within an arbitrary range in the first graph on a display screen displaying the first graph, obtaining a range of values of record items corresponding to the designated region, extracting a record within the obtained range of values of record items from the plurality of stored records, defining other record items as graph axes from the extracted record, and displaying a second graph based on the extracted record by using the defined record items as graph axes.

A record extraction apparatus and a program recording medium which records record extraction programs are also provided.

In the present invention, only by inputting narrowing conditions (e.g., narrowing items and data ranges) on a graph display screen displayed by plotting record data contained in a target record file, record data meeting the narrowing conditions is extracted on the graph display screen. Consequently, records can be easily narrowed on the graph display screen.

The result is that diversified analysis on the record data can be easily performed by a simple input operation on the graph and the efficiency of work of, e.g., forming various analytical materials using the record data can be improved.

Also, when the present invention is applied to database systems used in enterprises and the like, necessary records can be extracted from the database by a simple operation. This makes it unnecessary to ask an operator having expert knowledge on the database or perform a cumbersome operation at a system terminal managing the database. Consequently, it is possible to provide an operation environment in which any user can readily extract records from the database system. This improves the availability of the database.

DETAILED DESCRIPTION OF THE PREFERRED EMBODIMENTS

First Embodiment

The first embodiment will be described in detail below with reference to FIGS. 1 to 5.

The configuration of this embodiment will be described first.

Figure 1:
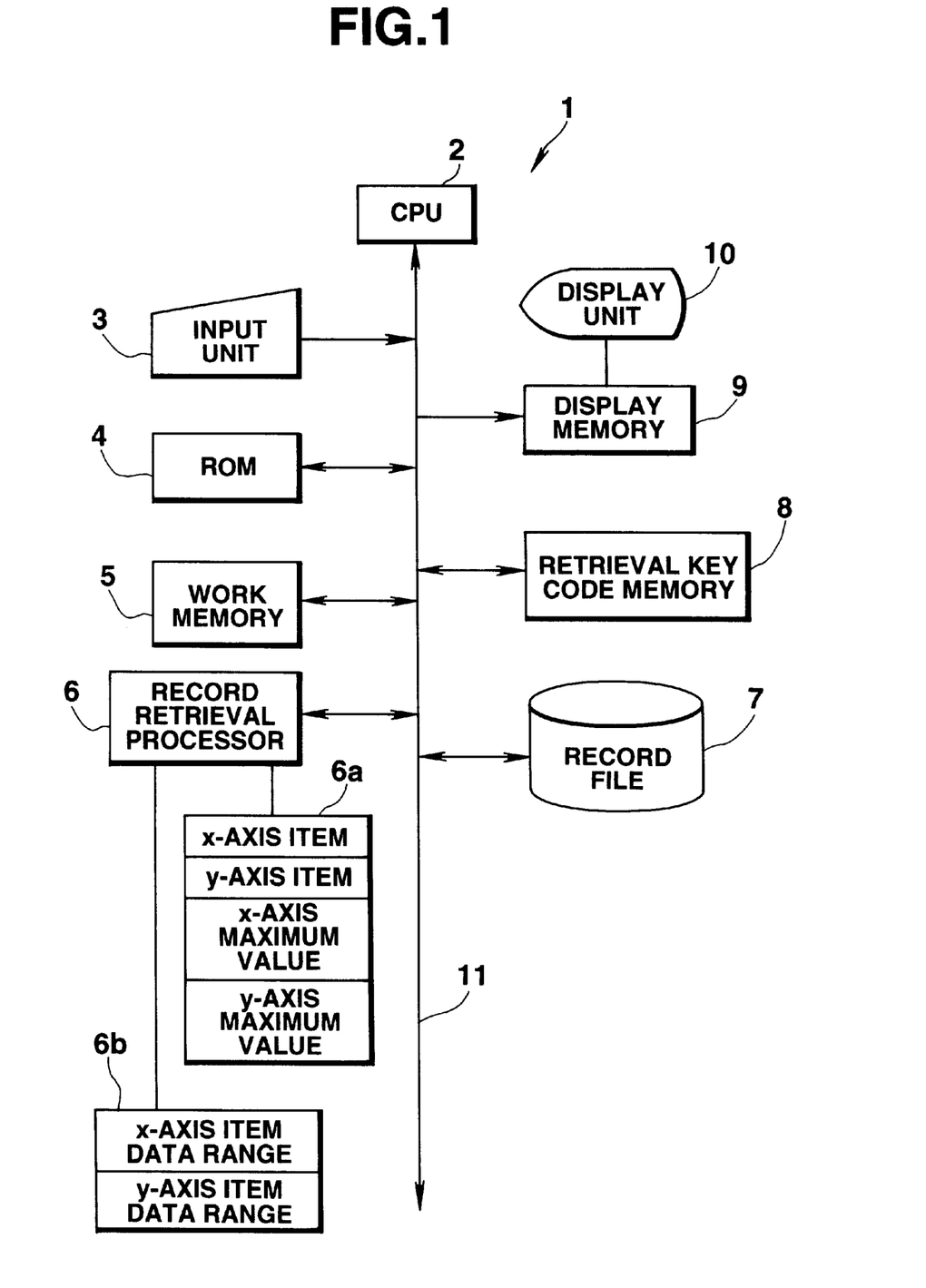
FIG. 1 is a block diagram showing the main part of a computer system according to the first embodiment.

FIG. 1 is a block diagram showing the main part of a computer system 1 according to the first embodiment.

Referring to FIG. 1, the computer system 1 includes a CPU 2, an input unit 3, a ROM 4, a work memory 5, a record retrieval processor 6, a record file 7, a retrieval key memory 8, a display memory 9, and a display unit 10. All these components are connected to a bus 11.

The CPU (Central Processing Unit) 2 controls the individual components in the computer system 1 in accordance with various control programs stored in the ROM 4, executes various information processing, and displays the processes and the processing results on the display unit 10 via the display memory 9. Also, when record retrieval processing is executed by the record retrieval processor (to be described later), the CPU 2 displays the retrieved records on the display unit 10.

The input unit 3 includes cursor keys, numerical input keys, and various function keys and outputs a depression signal of a depressed key to the CPU 2. The ROM (Read Only Memory) 4 stores the various control programs executed by the CPU 2. The work memory 5 forms memory areas which temporarily store data processed when the CPU 2 executes various control processing.

In performing record retrieval processing (to be described later), the record retrieval processor 6 forms a two-dimensional distribution graph from a plurality of records stored in the record file 7 on the basis of designated items on the x- and y-axes. When a retrieval range is designated on the displayed distribution graph, the record retrieval processor 6 retrieves records within the designated range, reads out records on the basis of key codes of the retrieved records corresponding to the individual items, and displays the readout records on the display unit 10.

The record retrieval processor 6 has a distribution graph formation item memory 6a and a retrieval range item memory 6b. In forming the two-dimensional distribution graph from a plurality of records stored in the record file 7 in the record retrieval processing described above, the distribution graph formation item memory 6a stores an x-axis item, a y-axis item, an x-axis maximum value, and a y-axis maximum value as distribution graph formation basic data which is input in an input window (to be described later). The retrieval range item memory 6b stores an x-axis item data range and a y-axis item data range as data of the retrieval range designated on the distribution graph.

The record file 7 stores a plurality of record files each consisting of item data corresponding to a plurality of key codes. During the record retrieval processing executed by the record retrieval processor 6, the retrieval key code memory 8 forms memory areas for storing key codes corresponding to items set in records within the retrieval range.

The display memory 9 forms memory areas for temporarily storing input display data from the CPU 2 and transfers the stored display data to the display unit 10 in accordance with the display rate of the display unit 10. The display unit 10 consists of, e.g., a CRT (Cathode Ray Tube) and displays the display data input from the CPU 2 and stored in the display memory 9.

The operation of the first embodiment will be described below.

The record retrieval processing executed by the record retrieval processor 6 of the computer system 1 of the first embodiment will be described with reference to the flow chart in FIG. 2.

When starting the record retrieval processing, the record retrieval processor 6 displays an input window for designating an x-axis item and a y-axis item for forming a distribution graph from record files stored in the record file 7 on the display unit 10, and stores the x- and y-axis items input in the input window from the input unit 3 into the distribution graph formation item memory 6a (step Sl). An x-axis coordinate maximum value and a y-axis coordinate maximum value when the x-and y-axis items are plotted on the distribution graph are input in the input window from the input unit 3. The record retrieval processor 6 stores the input x-and y-axis coordinate maximum values into the distribution graph formation item memory 6a (steps S2 and S3).

The record retrieval processor 6 displays graph axes based on the x- and y-axis coordinate maximum values on the display unit 10 (step S4), and detects records corresponding to the x- and y-axis items in the record file 7 (step S5). The record retrieval processor 6 then checks whether the detected records are within the range of the x- and y-axis coordinate maximum values (step S6). If the records are outside the range, the flow advances to step S9. If the records are inside the range, the record retrieval processor 6 extracts these records, converts data of these records corresponding to the x- and y-axis items into display coordinates (step S7), and plots the data at the display coordinates on the graph previously displayed (step S8).

The record retrieval processor 6 then checks whether the detection of target records is completed (step S9). If the record detection is not completed, the flow returns to step S5, and the record retrieval processor 6 repeats plotting of data on the graph. If the record detection is completed, this means that the formation of the distribution graph is completed. Accordingly, the record retrieval processor 6 displays a message which prompts the user to designate a display coordinate range, i.e., a data retrieval range, on the distribution graph, and waits until designation of a display coordinate range is input (step S10). When the display coordinate range is designated on the distribution graph from the input unit 3, the record retrieval processor 6 converts the display coordinate range into an x-item data range (step S11) and stores the x-axis item data range in the retrieval range item memory 6b (step S12). Also, the record retrieval processor 6 converts the display coordinate range into a y-item data range (step S13) and stores the y-axis item data range in the retrieval range item memory 6b (step S14).

Subsequently, the record retrieval processor 6 reads out a record corresponding to the x- and y-axis item data ranges stored in the retrieval range item memory 6b from the record file 7 (step S15). The record retrieval processor 6 then checks whether the x- and y-axis item data of the readout record are within the x- and y-axis item data ranges, respectively, on the graph (steps S16 and S17). If the data are outside the data ranges, the flow advances to step S19. If the data are inside the data ranges, the record retrieval processor 6 stores the key codes of the x-and y-axis item data of the record into the retrieval key code memory 8 (step S18), and checks whether the record read is completed (step S19).

If the record read access is not completed, the flow returns to step S15, and the record retrieval processor 6 repeatedly reads out records within the data ranges and stores the key codes. If the record read access is completed, the record retrieval processor 6 reads out each corresponding record from the record file 7 on the basis of the key codes stored in the retrieval key code memory 8 (step S20). The record retrieval processor 6 develops the readout records into a predetermined list in the work memory 5, displays the list on the display unit 10 (step S21), and completes the processing.

Processes of practical data retrieval/extraction processing done in the above record retrieval/extraction processing will be described below with reference to FIG. 3.

Figure 3:
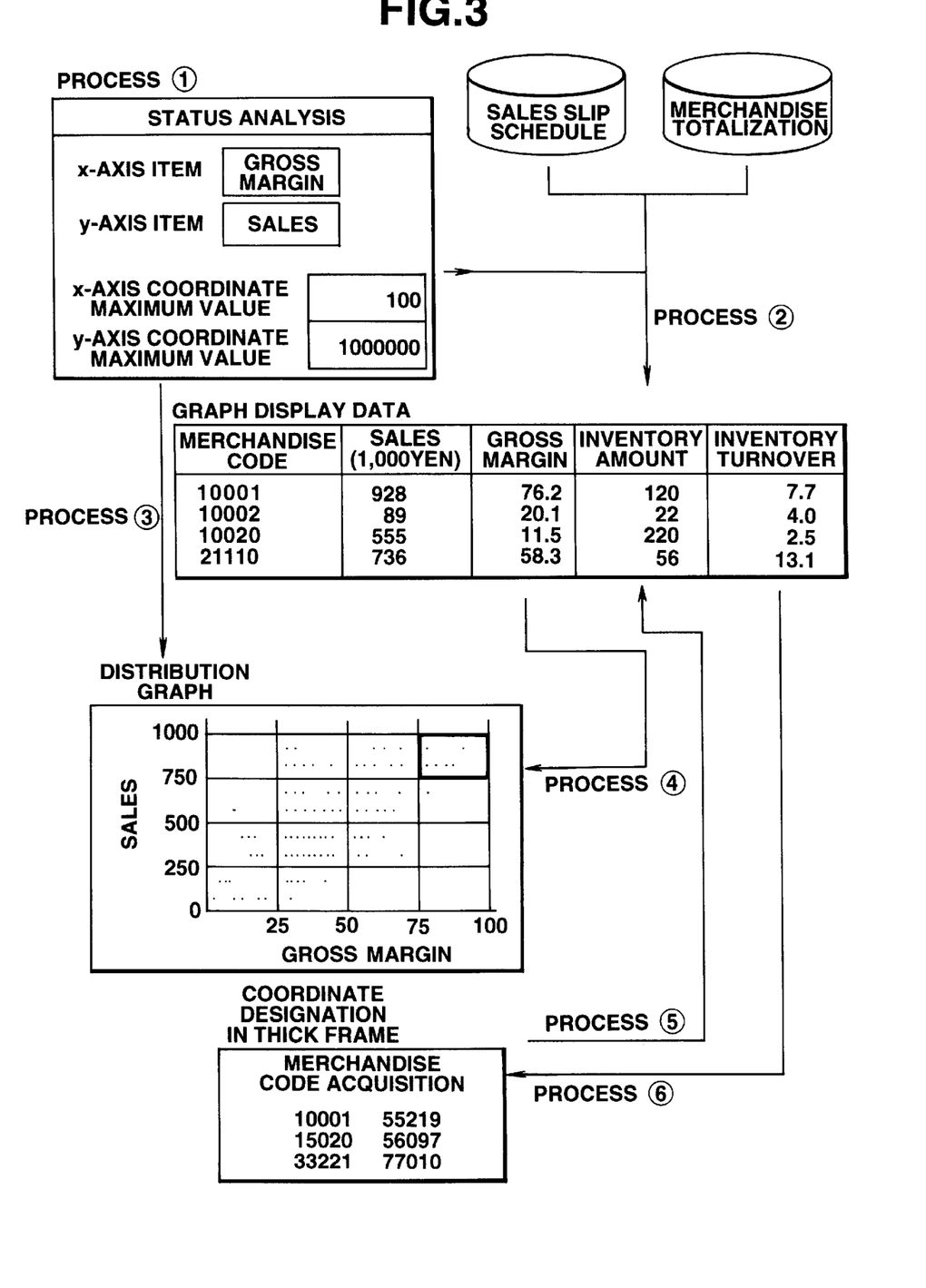
FIG. 3 is a view showing practical data retrieval processes in the data retrieval processing in FIG. 2.

First, as described above in steps S1 to S3, the display unit 10 displays a "status analysis" input window, process ① in FIG. 3, which prompts the user to input items for forming a trend analysis distribution graph. In process ① in FIG. 3, "gross margin" and "sales" are set as the x- and y-axis items, respectively, and the respective maximum values are set as the x- and y-axis coordinate maximum values.

That is, "gross margin" and "sales" are input as the x- and y-axis items, respectively, from the input unit 3, and "100" and "1000000" are input as the x-axis input item (gross margin) and the y-axis input item (sales), respectively. On the basis of these input items, as described previously in step S5, records are detected from a sales slip schedule file and a merchandise totalization file, FIG. 3, stored in the record file 7, and graph display data is extracted, as indicated by process ② in FIG. 3.

Figure 2:
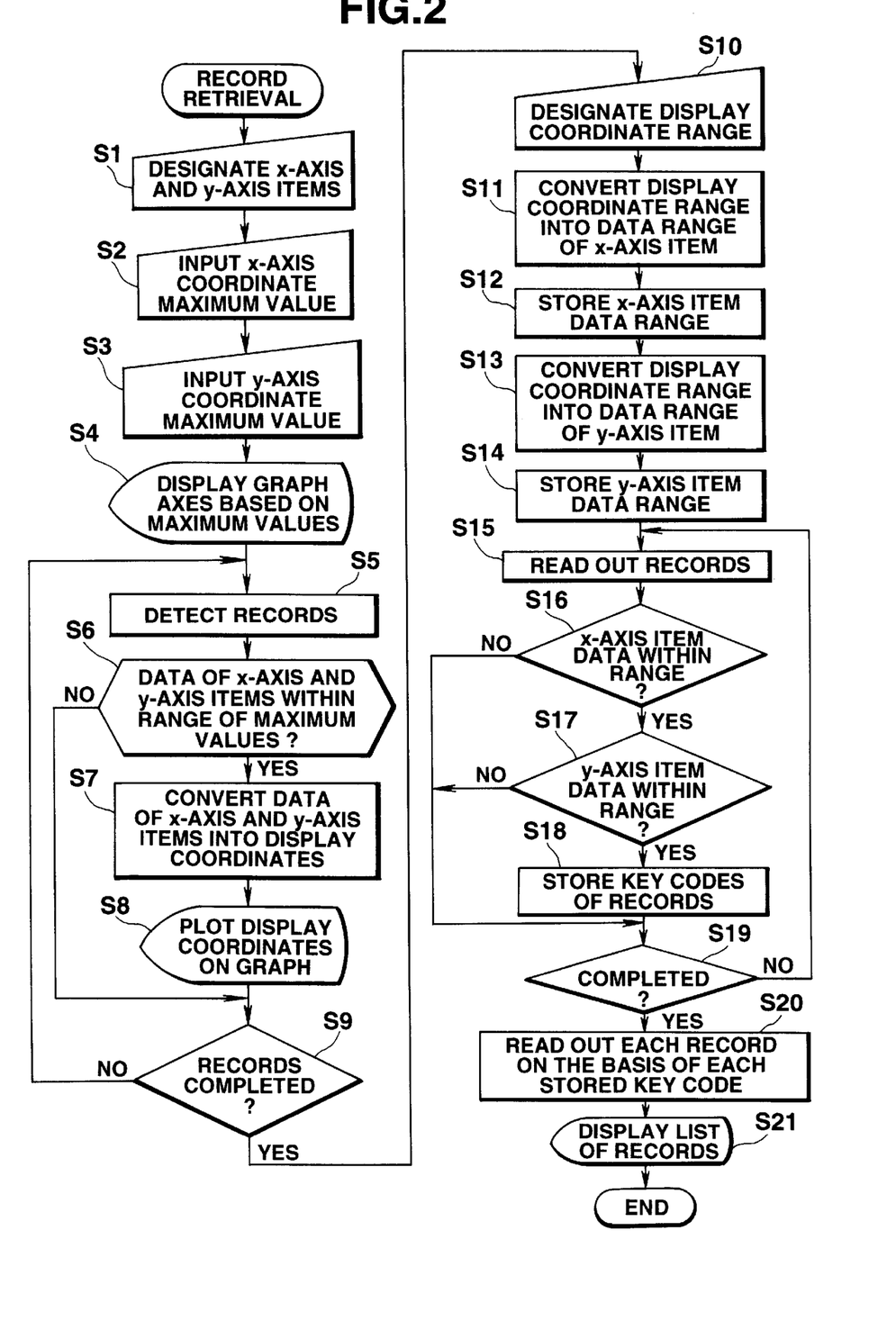
FIG. 2 is a flow chart of data retrieval processing executed by a data retrieval processor in FIG. 1.

As described in step S4 of FIG. 2, graph axes based on the x- and y-axis coordinate maximum values are formed and displayed on the display unit 10 as indicated by process ③ in FIG. 3. Accordingly, as explained in steps S5 to S9 of FIG. 2, data of each record of the readout graph display data, in this example gross margin data and sales data, corresponding to the x- and y-axis items, are converted into display coordinates and plotted. Consequently, a distribution graph is formed and displayed as indicated by process ④ in FIG. 3. Subsequently, when an operation of drawing and designating a retrieval range in a thick frame is performed on this distribution graph as explained in step S10 of FIG. 2, records corresponding to the coordinates of this designated range are read out from the graph display data as described in steps S11 to S21 of FIG. 2. As indicated by processes ⑤ and ⑥ in FIG. 3, merchandise codes are obtained as the key codes of these readout records and displayed in the form of a list.

The foregoing is the procedure of the record retrieval/extraction processing.

Practical examples of the distribution graph formed in the above record retrieval/extraction processing and the retrieval records will be described below with reference to FIGS. 4 and 5.

Figure 4:
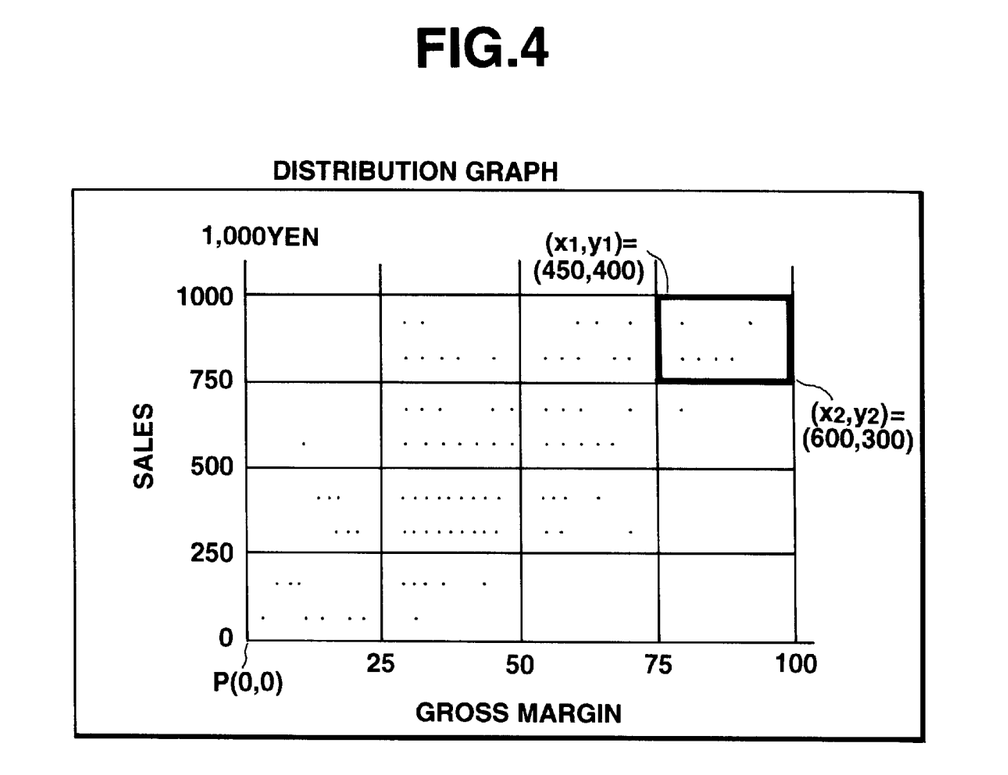
FIG. 4 is a view showing a practical example of a distribution graph formed in the record retrieval processing in FIG. 2.

In the distribution graph shown in FIG. 4, assume that the x- and y-axis coordinate maximum values are $$\text{gross margin (}x\text{-axis): } 100.00 \tag{a}$$

$$\text{sales (}y\text{-axis): } 1{,}000\ (1{,}000\ \text{yen}) \tag{b}$$

and the maximum values of dot coordinates in the graph drawing region are $$x\text{-axis: } 600 \tag{c}$$

$$y\text{-axis: } 400 \tag{d}$$

Note that the position of P in FIG. 4 is defined as the origin of the dot coordinates in the graph drawing region and each dot coordinate is represented by the number of display dots from the origin P. Assuming that if a display region within a range of $$x1: 450 \tag{e}$$

$$y1: 400 \tag{f}$$

$$x2: 600 \tag{g}$$

$$y2: 300 \tag{h}$$

is designated in a thick frame as the dot coordinates in the retrieval range on this distribution graph, the dot coordinates within the designated range are converted into data corresponding to the coordinate axes of the display data by the following calculations:

maximum sales is $$1{,}000(b) \times (400(e)/400(f)) = 1{,}000$$

minimum sales is $$1{,}000(b) \times (300(h)/400(d)) = 750$$

maximum gross margin is $$100(a) \times (600(g)/600(c)) = 100$$

minimum gross margin is $$100(a) \times (450(e)/600(c)) = 75$$

Figure 5:
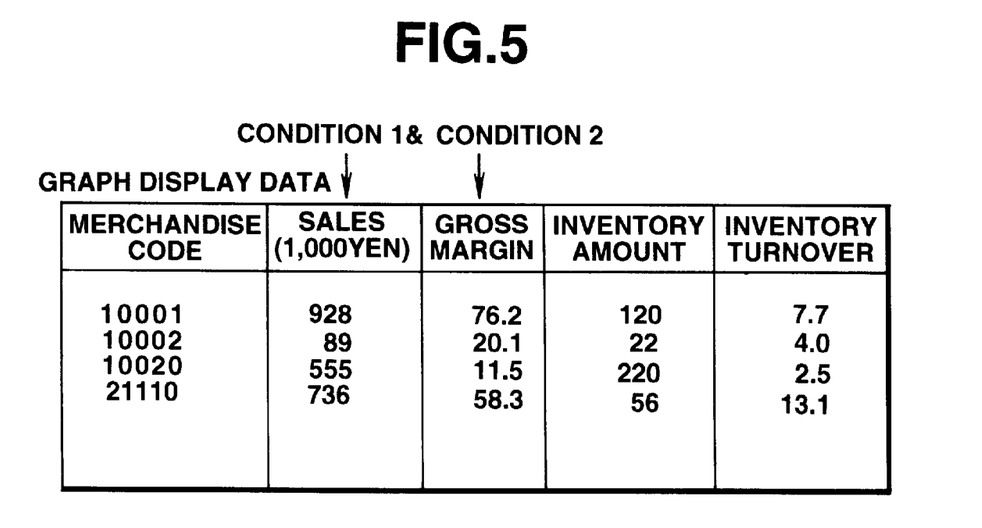
FIG. 5 is a view showing practical examples of key codes obtained by retrieval within a retrieval designation range on the distribution graph in FIG. 4.

Consequently, the retrieval conditions for the graph display data in FIG. 5 are condition 1: minimum sales (750) or more and maximum sales (1,000) or less condition 2: minimum gross margin (75) or more and maximum gross margin (100) or less On the basis of these retrieval conditions, records meeting the conditions 1 and 2 are retrieved and extracted from the graph display data in FIG. 5, and merchandise codes such as merchandise code 10001 are obtained.

In the computer system 1 according to the first embodiment as described above, trend analysis on data is performed by using a distribution graph formed on the basis of simple item designation, and the range of coordinates is designated on the distribution graph. With this simple operation, it is possible to achieve a function equivalent to designating key codes of records and designating a retrieval range. Consequently, desired records can be easily obtained from the key codes and the retrieval range.

Accordingly, it is possible to simplify the work of inputting retrieval conditions when data retrieval is performed by trend analysis and to thereby improve the work efficiency.

In the first embodiment described above, records are plotted on a two-dimensional distribution graph. However, it is also possible to plot these records on one- or three-dimensional coordinates. Additionally, the graph image for performing trend analysis is not restricted to a distribution graph but can be expressed by, e.g., a bar graph or a graph of broken line.

Second Embodiment

The second embodiment will be described in detail below with reference to FIGS. 6 to 12.

FIGS. 6 to 12 are views showing a computer system according to the second embodiment.

The configuration of this embodiment will be described first.

Figure 6:
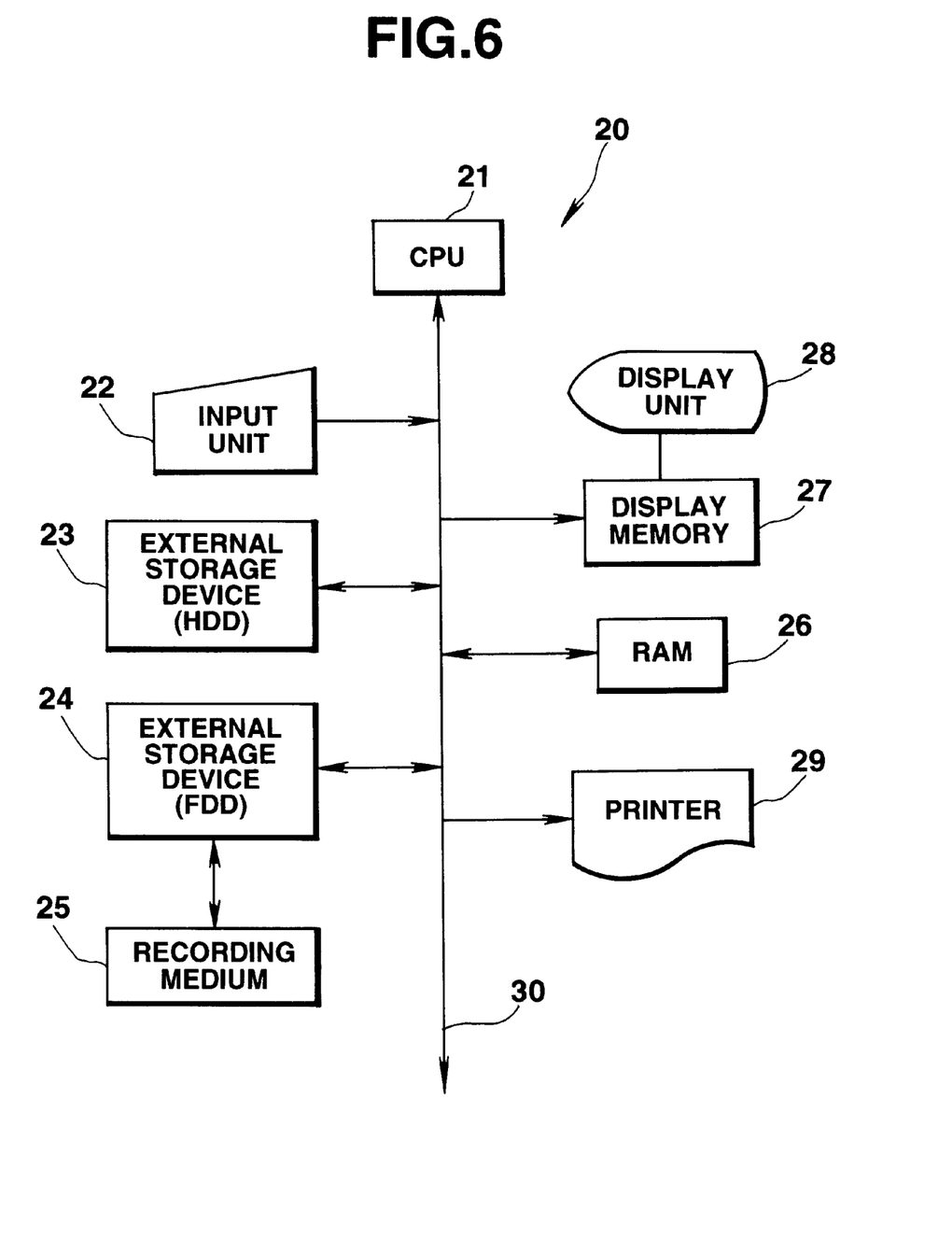
FIG. 6 is a block diagram showing the major components of a computer system according to the second embodiment.
Figure 7:
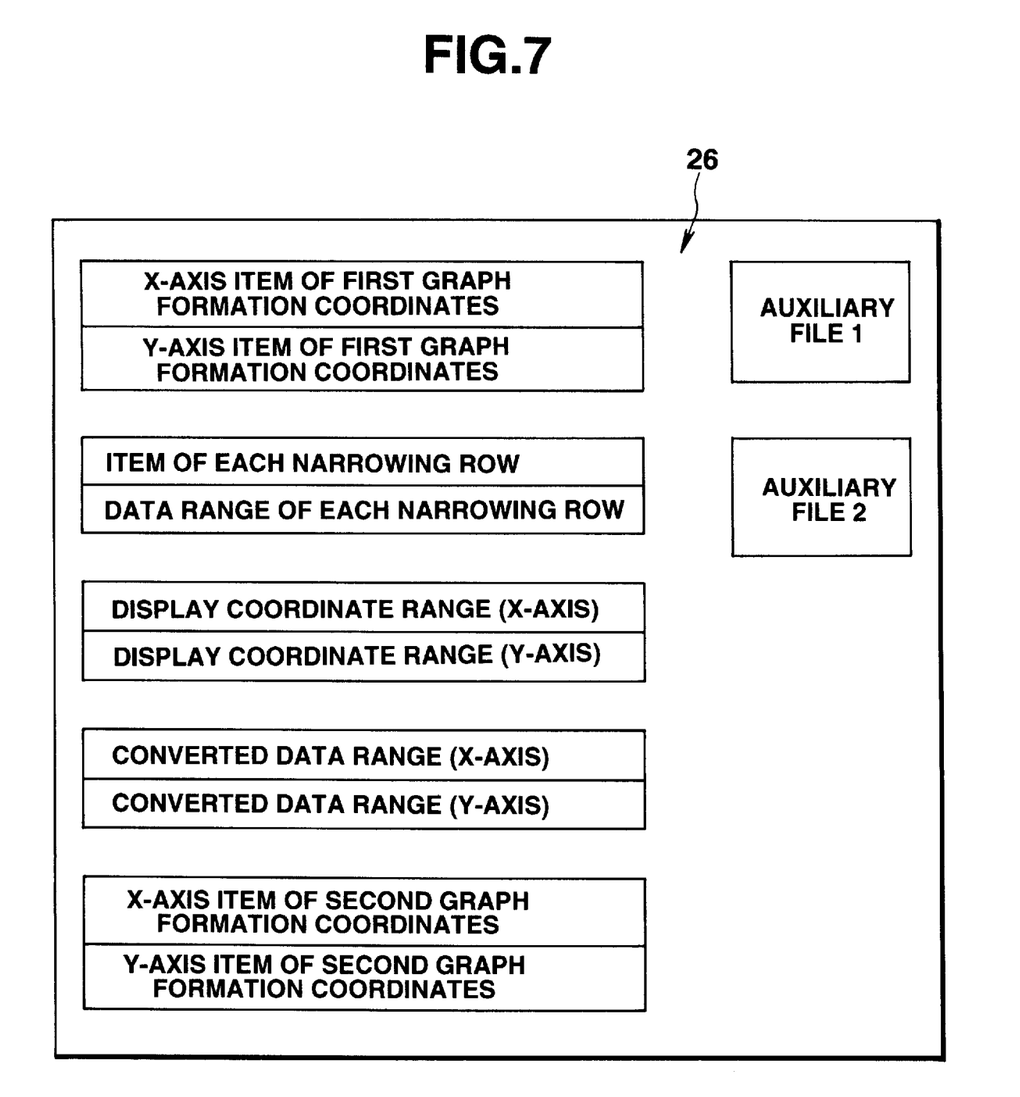
FIG. 7 is a view showing the memory configuration in a RAM in FIG. 6.

FIG. 6 is a block diagram showing the main part of a computer system 20 according to the second embodiment.

Referring to FIG. 6, this computer system 20 includes a CPU 21, an input unit 22, an external storage device (HDD)

23, an external storage device (FDD) 24, a recording medium 25, a RAM 26, a display memory 27, a display unit 28, and a printer 29. All these components are connected to a bus 30.

The CPU (Central Processing Unit) 21 reads out programs from the recording medium 25 inserted into the external storage device (FDD) 24 or from the external storage device (HDD) 23 in which the programs transferred from the recording medium 25 via the external storage device (FDD) 24 are already stored. In accordance with the readout programs, the CPU 21 controls the individual components in the computer system 20, executes various information processing, and displays the processes and the processing results on the display unit 28 via the display memory 27. Also, when performing record extraction processing (to be described later), the CPU 21 displays records extracted from the external storage device (HDD) 23 on the display unit 28.

The input unit 22 includes cursor keys, numerical input keys, and various function keys and outputs a depression signal of a depressed key to the CPU 21. The external storage device (HDD) 23 is a hard disk drive which stores the various control programs executed by the CPU 21. These control programs are transferred from the recording medium 25 via the external storage device (FDD) 24 and stored in the external storage device (HDD) 23 in advance. The external storage device (HDD) 23 also stores a plurality of record files each consisting of item data corresponding to a plurality of key codes.

The external storage device (FDD) 24 is a floppy disk drive. When the recording medium 25, i.e., a floppy disk, is inserted, the external storage device (FDD) 24 writes various programs or data into the recording medium 25 or reads out programs or data recorded in the recording medium 25.

The RAM (Random Access Memory) 26 forms memory areas for temporarily storing data processed when the CPU 21 executes various control processing. In particular, the RAM 26 forms memory areas (FIG. 7) which store data used in record extraction processing. The memory areas shown in FIG. 7 store "X- and Y-axis items of first graph formation coordinates" indicating item data for forming a first graph from an extraction target record file, "item of each narrowing row" indicating the item data of narrowing conditions on which records plotted in the first graph are narrowed, "data range of each narrowing row" indicating the data range of each narrowing item, "display coordinate ranges (X- and Y-axes)" indicating the display range of records designated in the first graph, "converted data ranges (X- and Y-axes)" for converting the display range into the X- and Y-axis item data ranges, "X- and Y-axis items of second graph formation coordinates" indicating item data for forming a second graph from the display range records designated in the first graph, and "auxiliary files 1 and 2" storing record data extracted under the narrowing conditions.

The display memory 27 forms memory areas for temporarily storing input display data from the CPU 21 and transfers the stored display data to the display unit 28 in accordance with the display rate of the display unit 28. The display unit 28 consists of, e.g., a CRT (Cathode Ray Tube) and displays the display data input from the CPU 21 and stored in the display memory 27. The printer 29 prints out input printing data from the CPU 21 on predetermined sheets.

The operation of the second embodiment will be described below.

Record extraction processing executed by the CPU 21 of the computer system 20 of the second embodiment will be described with reference to the flow charts in FIGS. 8 to 10.

When the record extraction processing is started, a record extraction target file is designated from the record file stored in the external storage device (HDD) 23 (step P1). The CPU 21 reads out the target file and displays it on the display unit 28.

The CPU 21 displays, on the display unit 28, an input window used to designate X- and Y-axis items of first graph formation coordinates for forming a first graph from the target file. The X- and Y-axis items of first graph formation coordinates are designated in the input window (step P2). The CPU 21 stores the X- and Y-axis items of first graph formation coordinates in the corresponding memory area of the RAM 26 shown in FIG. 7.

Subsequently, the CPU 21 designates records in the target record file displayed on the display unit 28 in step P1 (step P3). To graph the designated records, the CPU 21 converts the data of the X- and Y-axis items stored in the RAM 26 in step P2 into display coordinates (step P4). The CPU 21 then plots the record data in red at the display coordinates on the first graph whose graph axes are the X- and Y-axis items, develops the graph in the display memory 27, and displays the graph on the display unit 28 (step P5). The CPU 21 repetitively executes the processing from step P3 to step P5 until all records in the target file are completely plotted on the first graph (step P6).

The CPU 21 then displays a menu on the display unit 28 and displays "1. designate range, 2. input conditions" in the menu, and the user selects the process number of the next processing (step P7). When the process number is selected in this menu (step P8), e.g., when process number 2, i.e., "input conditions", is selected, an operation of inputting narrowing conditions of the first graph displayed on the display unit 28 is performed (step P9). The CPU 21 stores each item of the input narrowing conditions as the item of each narrowing row and the data range of each narrowing row in the corresponding memory area of the RAM 26. On the basis of the item of each narrowing row and the data range of each narrowing row thus stored, the CPU 21 extracts records meeting the conditions and stores the extracted record data in auxiliary file 1 of the RAM 26 (step P10).

Subsequently, the CPU 21 designates the record data in auxiliary file 1 (step P11). To graph the designated records, the CPU 21 changes the data of the X- and Y-axis items stored in the RAM 26 in step P2 into display coordinates (step P12). The CPU 21 then changes the plot color of the record data on the first graph whose graph axes are the X- and Y-axis items into blue, develops the graph in the display memory 27, and displays the graph in blue on the display unit 28 (step P13). The CPU 21 repetitively executes the processing from step P11 to step P13 until all records in auxiliary file 1 are completely plotted on the first graph (step P14).

The CPU 21 displays a menu on the display unit 28 and displays "1. display details" in the menu, and the user selects the process number of the next processing (step P15). When process number 1 is selected in this menu (step P16), the CPU 21 displays a list of detailed contents of the record data stored in auxiliary file 1 or 2 of the RAM 26 (step P17) and completes this processing.

Figure 8:
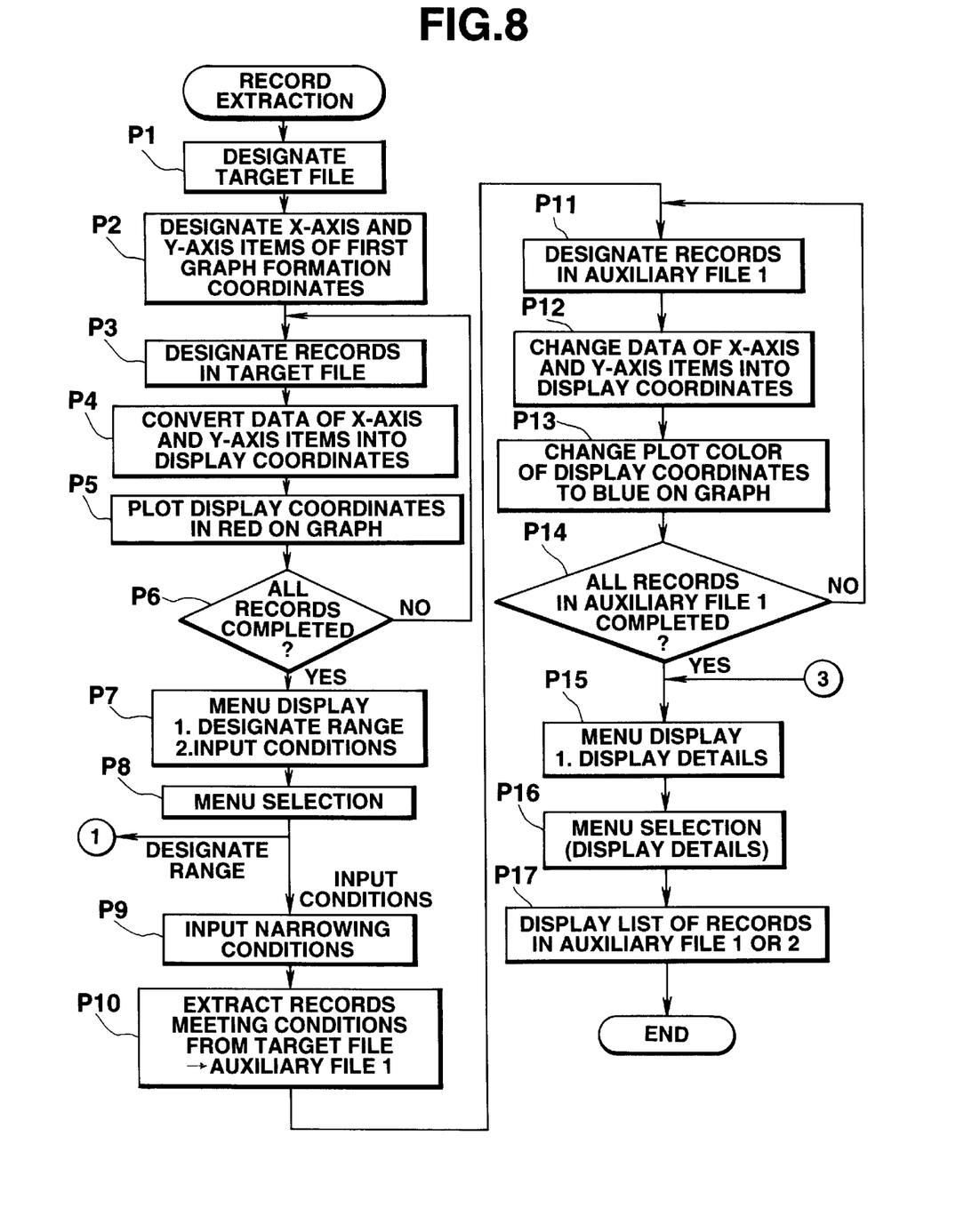
FIG. 8 is a flow chart of record extraction processing executed by a CPU in FIG. 6.
Figure 9:
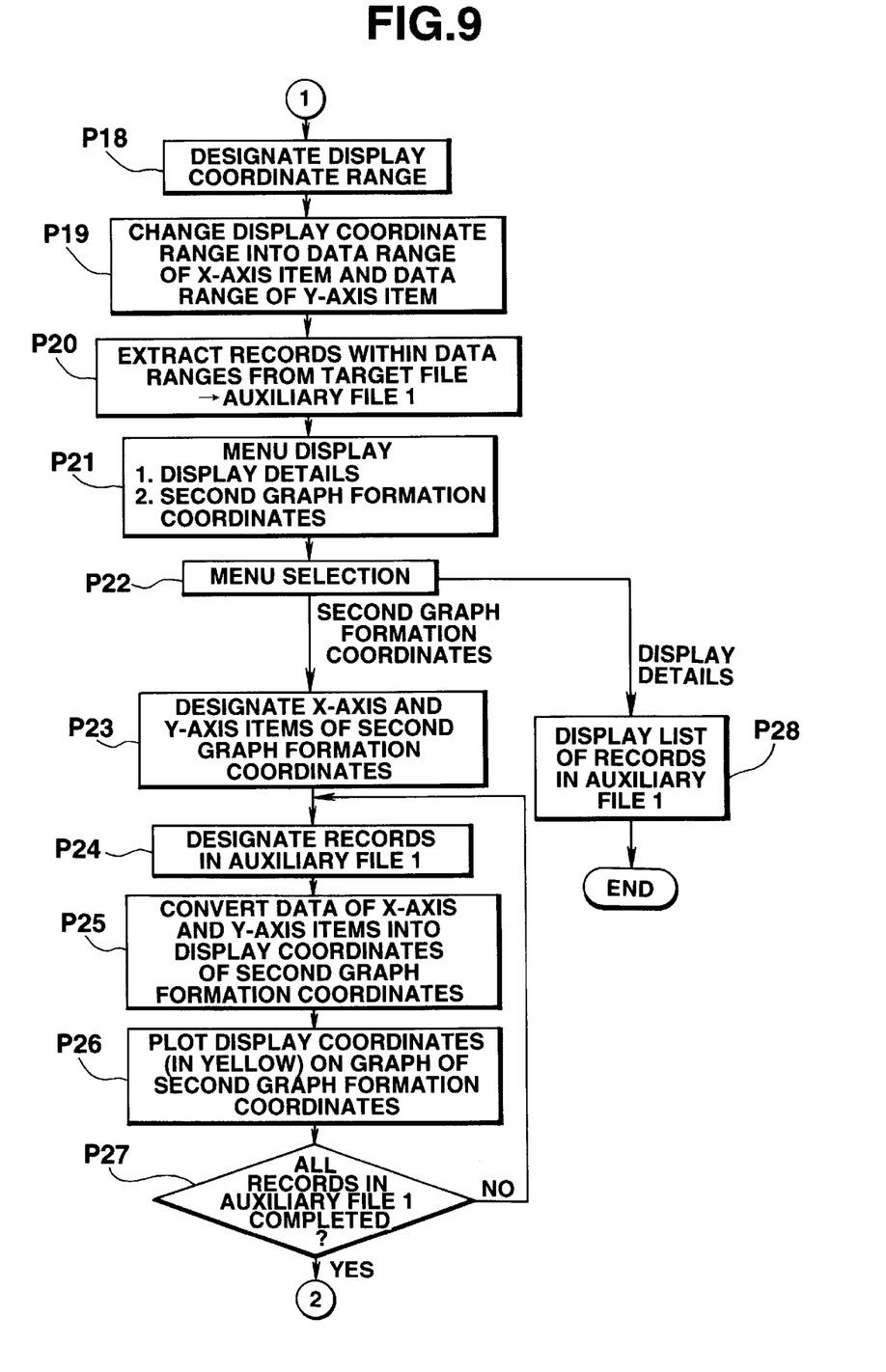
FIG. 9 is a flow chart of the record extraction processing subsequent to FIG. 8.
Figure 10:
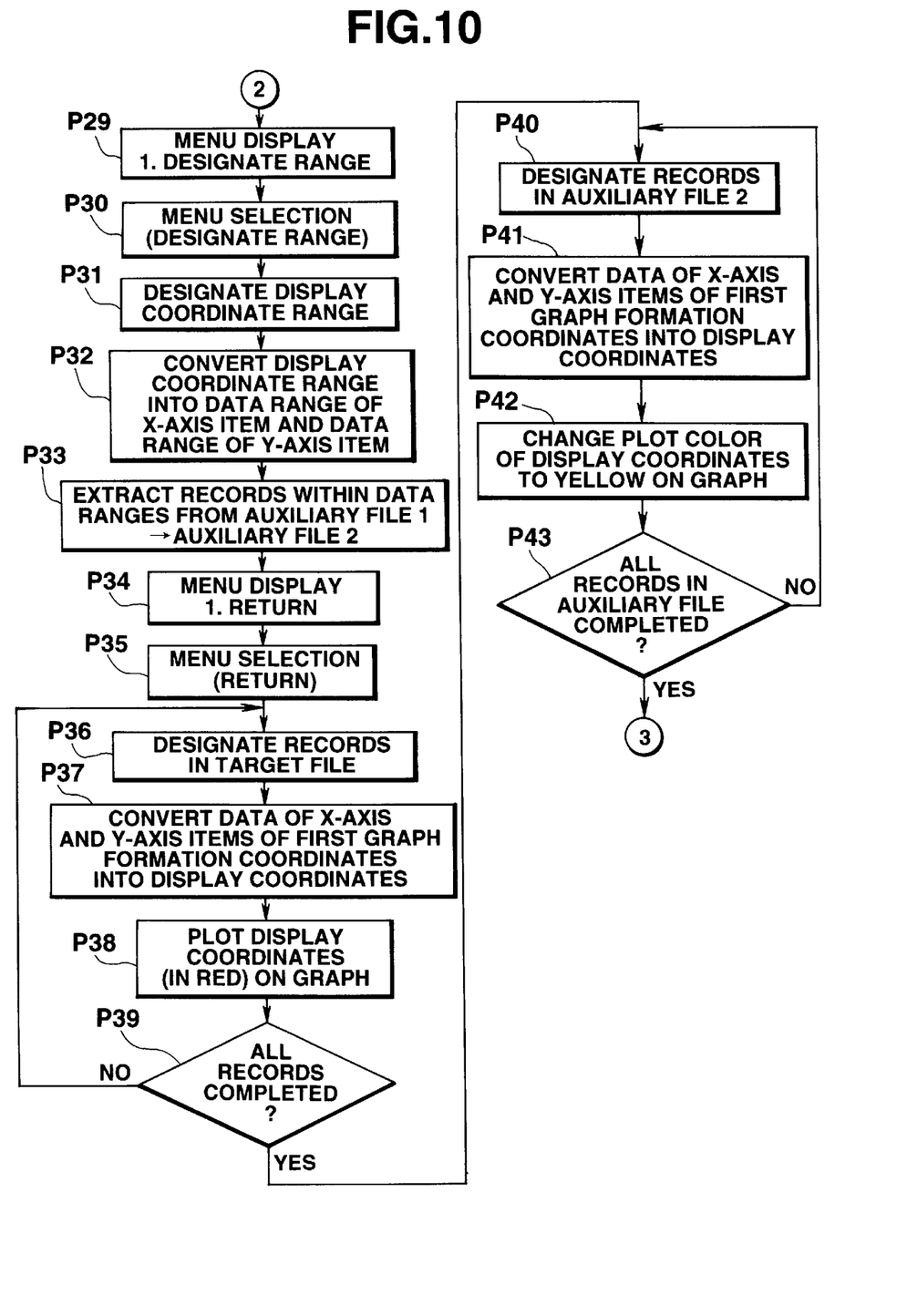
FIG. 10 is a flow chart of the record extraction processing subsequent to FIG. 9.

If process number 1, i.e., "designate range", is selected from the menu display in step P8, the flow advances to step P18 in FIG. 9, and a display coordinate range is designated on the first graph displayed on the display unit 28. The CPU 21 changes the display coordinate range into data ranges of the X-and Y-axis items and stores the data ranges as a converted data range (X-axis) and a converted data range (Y-axis) in the corresponding memory area of the RAM 26 (step P19).

Subsequently, the CPU 21 extracts records corresponding to the data ranges from the target file and stores the extracted record data in auxiliary file 1 of the RAM 26 (step P20). The CPU 21 displays a menu on the display unit 28 and displays "1. display details, 2. second graph formation coordinates" in the menu, and the user selects the process number of the next processing (step P21). When the process number is selected in this menu (step P22), e.g., when process number 2, i.e., "second graph formation coordinates", is selected, the CPU 21 displays, on the display unit 28, an input window used to designate X- and Y-axis items of second graph formation coordinates for forming a second graph. The user designates X- and Y-axis items of second graph formation coordinates in the input window, and the CPU 21 stores the designated X-and Y-axis items of second graph formation coordinates in the corresponding memory area of the RAM 26 (step P23).

The CPU 21 then designates the record data stored in auxiliary file 1 of the RAM 26 in step P20 (step P24). To graph the designated records, the CPU 21 converts the data of the X- and Y-axis items of second graph formation coordinates stored in the RAM 26 in step P23 into display coordinates (step P25). The CPU 21 then plots the designated record data in yellow on the second graph whose graph axes are the X- and Y-axis items, develops the graph in the display memory 27, and displays the second graph on the display unit 28 (step P26). The CPU 21 repetitively executes the processing from step P24 to step P26 until all records in auxiliary file 1 are completely plotted on the second graph (step P27).

If process number 1, i.e., "display details", is selected in the menu selection in step P22, the CPU 21 displays a list of detailed contents of the extracted record data stored in auxiliary file 1 on the display unit 28 (step P28) and completes this processing.

When the extracted records are completely plotted on the second graph, the flow advances to step P29. The CPU 21 displays a menu on the display unit 28 and displays "1. designate range" in the menu, and the user selects the process number of the next processing. When process number 1 is selected in this menu (step P30), the CPU 21 allows the user to designate a display coordinate range on the second graph displayed on the display unit 28 (step P31). The CPU 21 changes the designated display coordinate range into data ranges of the X- and Y-axis items and stores the data ranges as a converted data range (X-axis) and a converted data range (Y-axis) in the corresponding memory area of the RAM 26 (step P32).

Subsequently, the CPU 21 extracts records corresponding to the data ranges from auxiliary file 1 and stores the extracted record data in auxiliary file 2 of the RAM 26 (step P33). The CPU 21 then displays a menu on the display unit 28 and displays "1. return" in the menu, and the user selects the process number of the next processing (step P34). When process number 1 is selected in this menu (step P35), the CPU 21 designates records in the target file (step P36). The CPU 21 converts the data of the X- and Y-axis items of first graph formation coordinates stored in the RAM 26 in step P2 into display coordinates (step P37). The CPU 21 plots the designated record data in red on the first graph whose graph axes are the X- and Y-axis items, develops the graph in the display memory 27, and displays the first graph on the display unit 28 (step P38). The CPU 21 repetitively executes the processing from step P36 to step P38 until all records in the target file are completely plotted on the first graph (step P39).

The CPU 21 then designates the extracted records in auxiliary file 2 (step P40). The CPU 21 converts the data of the X- and Y-axis items of first graph formation coordinates into display coordinates (step P41). The CPU 21 changes the plot color of the designated record data on the first graph whose graph axes are the X- and Y-axis items to yellow and displays the graph (step P42). The CPU 21 repetitively executes the processing from step P40 to step P42 until all extracted records in auxiliary file 2 are plotted in yellow on the first graph (step P43).

When the processing of changing the plot color of the extracted records on the first graph is completed, the flow returns to the menu display processing in step P15 of FIG. 8.

Practical record extraction processes in the above record extraction processing will be described below with reference to FIGS. 11 and 12.

First, as described previously in steps P1 to P6, a record extraction target file is designated and X- and Y-axis items as first graph formation coordinates are designated. All record data in the target file are converted into display coordinates based on the X- and Y-axis items and plotted on a first graph. Consequently, as illustrated in FIG. 11, the display unit 28 displays the first graph in which "profit" and "sales", for example, are set as the X- and Y-axis items, respectively, and all record data in the target file are plotted in red.

Figure 11:
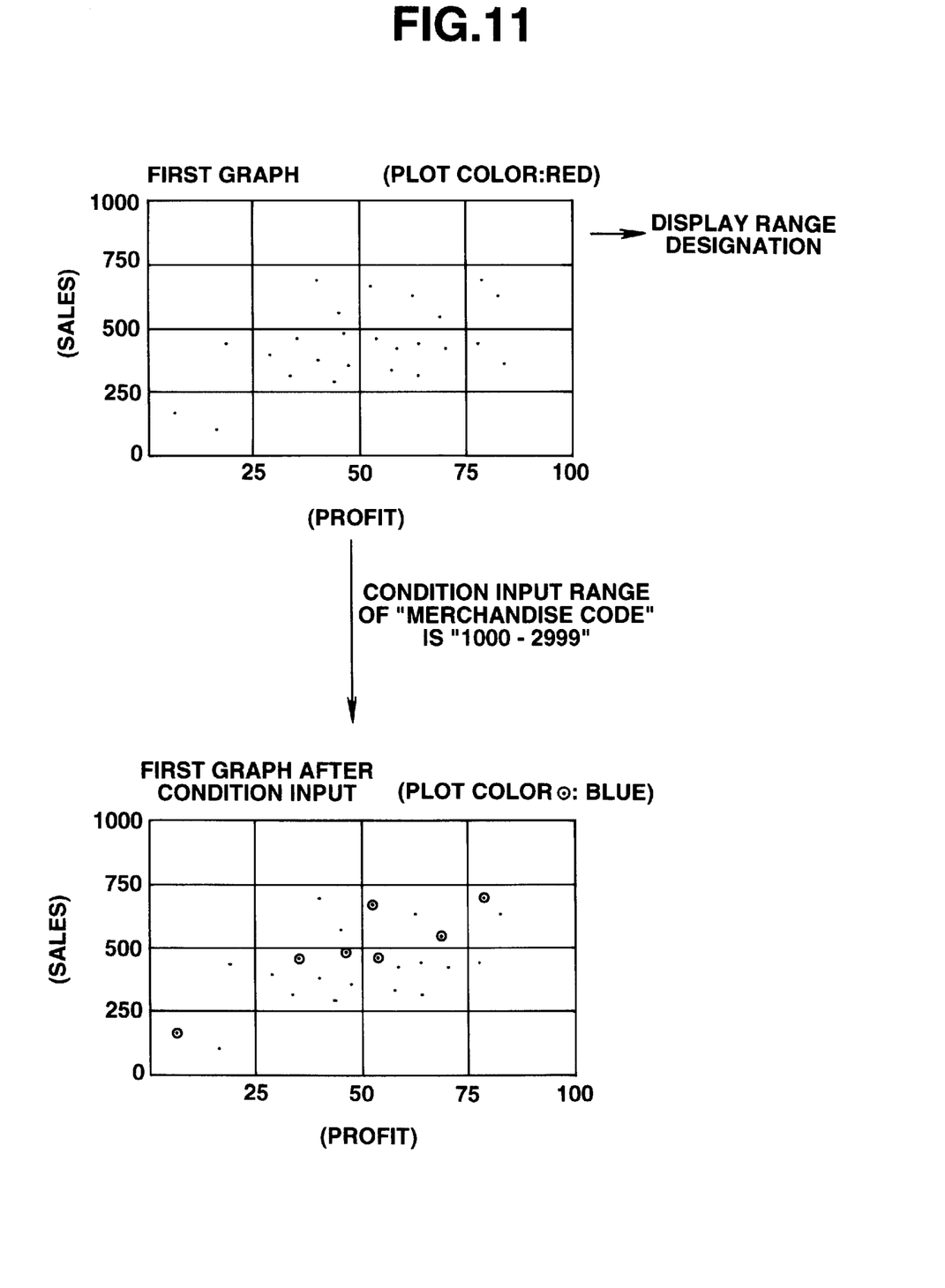
FIG. 11 is a view showing practical examples of records extracted by input of narrowing conditions and displayed on graphs during the record extraction processing in FIGS. 8 to 10.

When a narrowing condition for this first graph is input, e.g., when the range of "merchandise code" is set to "1000 to 2999" as in FIG. 11, record data meeting this narrowing condition are extracted, and the plot color of the extracted record data on the first graph is changed to blue as indicated by symbols ⊙ on the first graph in the lower portion of FIG. 11.

Figure 12:
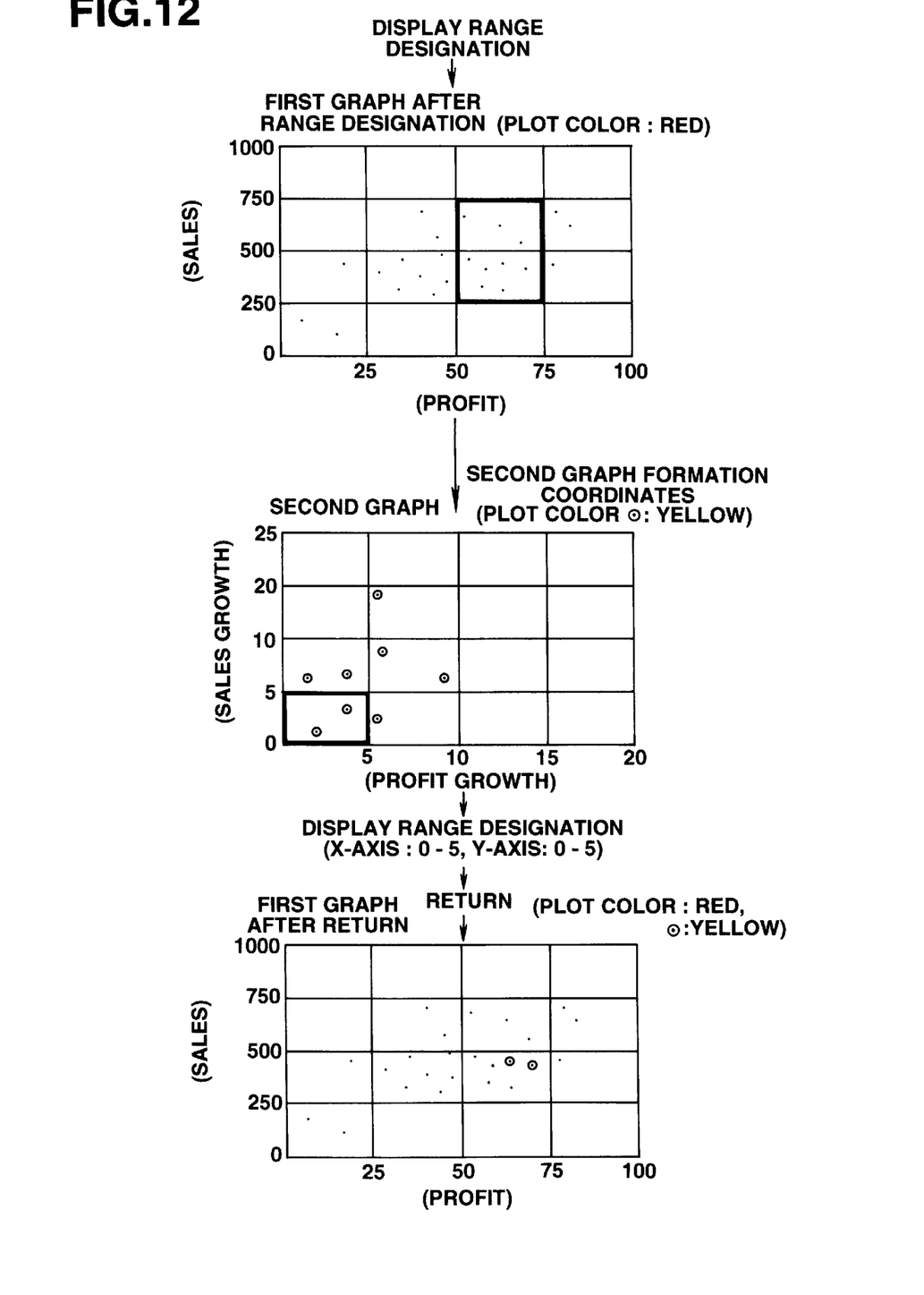
FIG. 12 is a view showing practical examples of records extracted and displayed on a second graph by range designation during the record extraction processing in FIGS. 8 to 10.

As described above in steps P18 to P20, when a display coordinate range is designated as indicated by the thick frame on the first graph shown in FIG. 12, records within a data range "50 to 75" of "profit" as the X-axis item in this display coordinate range and within a data range "250 to 750" of "sales" as the Y-axis item in the coordinate range are extracted and stored in auxiliary file 1 of the RAM 26.

As described in steps P21 to P27, second graph formation coordinates are selected from the menu display, and, as shown in FIG. 12, "profit growth" and "sales growth" are input as the X- and Y-axis items, respectively, of the second graph formation coordinates. Accordingly, the extracted records previously stored in auxiliary file 1 are converted into display coordinates on the basis of the second graph formation coordinates. As illustrated in FIG. 12, each record is plotted in yellow on the second graph as indicated by a symbol ⊙.

As explained in steps P29 to P33, "designate range" is selected from the menu display, and a display range is designated on the second graph, e.g., X axis: 0 to 5 and Y axis: 0 to 5 are designated in the display coordinate range of the second graph in FIG. 12. The designated data are converted into the data range "0 to 5" of "profit growth" as the X-axis item in this display coordinate range and the data range "0 to 5" of "sales growth" as the Y-axis item in the coordinate range. Record data stored in auxiliary file 1 and meeting these data ranges are extracted and stored in auxiliary file 2 of the RAM 26.

As explained in steps P34 to P39, "return" is selected from the menu display, and each record data in the target file is designated and converted into display coordinates based on the X- and Y-axis items as the first graph formation coordinates. Consequently, all record data in the target file are plotted in red on the first graph after the return as illustrated in the lower portion of FIG. 12.

Furthermore, as described in steps P40 to P43, each extracted record stored in auxiliary file 2 is designated and converted into display coordinates on the basis of the X- and Y-axis items of first graph formation coordinates. The plot color of each corresponding record on the first graph after the return is changed to yellow as indicated by a symbol ⊙ in FIG. 12.

In the computer system 20 of this second embodiment as described above, it is only necessary to input narrowing conditions (e.g., narrowing items and data ranges) on a graph display screen displayed by plotting record data in a target record file. With this simple operation record data meeting the narrowing conditions can be extracted and so displayed as to be clearly distinguished from others on the graph display screen. This allows the user to readily perform narrowing of records on the graph display screen.

Although narrowing is performed once in the example of the second embodiment shown in FIG. 11, it is also possible to perform the narrowing processing any number of times while changing the narrowing conditions. If this is the case, the plot color is preferably changed for each narrowing condition to thereby distinguishing the data from each other.

In the computer system 20 of the above second embodiment, by designating only a display coordinate range on a graph display screen displayed by plotting record data in a target record file, records meeting the display coordinate range are extracted and held. Additionally, by inputting only second graph formation coordinate items, the extracted record data are plotted on a second graph on the basis of the input second graph formation coordinate items. Accordingly, it is readily possible to form and display a graph based on other graph formation items from the extracted records on the graph display screen.

In this case, the display range designation can be performed on the graph of the second graph formation coordinates. Alternatively, the graph formation and the display range designation can be performed in a plurality of steps, e.g., three or four steps, or the narrowing of records can be sequentially performed only by the display range designation operation.

Also, the display range designation need not be performed. That is, records to be extracted can be narrowed from the positions of graph formation data at display positions directly designated on the graph display screen.

Furthermore, in the computer system 20 of the above second embodiment, the first graph can be returned only by inputting a simple instruction "return" while the second graph is being displayed. Additionally, by designating only a display range on the second graph before the first graph is returned, record data meeting the designated display range on the second graph can be displayed in a different plot color on the first graph when the first graph is displayed. Accordingly, it is possible to return the graph narrowed for analysis to the original graph with a simple operation and thereby enable the user to readily understand the relationship of extracted record data on the original graph.

By the use of the record extraction function installed in the computer system 20 of the above second embodiment, therefore, necessary record data can be easily extracted on the graph display screen. Also, a graph having newly extracted record items can be easily formed and displayed. Consequently, various analytical procedures based on record data can be facilitated on the graph display screen.

As a result, diversified analysis on record data can be easily performed by a simple input operation on the graph and the efficiency of work of, e.g., forming various analytical materials using the record data can be improved. It is also possible to easily form and display a graph from unprocessed records such as records in slips and extract and analyze necessary records. This makes the system readily usable in formation of materials for business strategies of enterprises.

Although the various control programs are stored in the ROM 4 in FIG. 1, these programs can be stored in another storage device. Also, the external storage device (HDD) 24 and the recording medium 25 shown in FIG. 6 can be other storage devices. All of these storage devices of FIGS. 1 and/or 6 may have a recording medium which stores various control programs and data, and the recording medium may be, for example, a magnetic or optical recording medium or a semiconductor memory. The recording medium may be fixed in a storage device or detachably mounted in a storage device. The programs and data stored in the recording medium can also be received and stored from another device connected via a communication line. Furthermore, a storage device including the recording medium can be provided in another device connected via a communication line, and the programs and data stored in the recording medium can be transmitted via the communication line. These recording media may store the programs for realizing the functions described in the flow charts of FIGS. 2, 8, 9, and 10, which indicate the operations of the first and second embodiments of the present invention, in the form of program codes readable by the CPU.

What is claimed is:

1. A record extracting apparatus for extracting records from a plurality of records stored in a storage means, each said record comprising a plurality of items, and said record extracting apparatus comprising:

means for designating a desired two items as ordinate and abscissa items, respectively, and for designating respective ordinate and abscissa data range values;

means for sequentially: (i) reading each record from the storage means, (ii) preparing a two-dimensional distribution graph in which corresponding coordinate positions in the two-dimensional distribution graph are plotted based on a data value of each item in the plurality of read out records which corresponds to the respective designated ordinate and abscissa items and which is within the designated ordinate and abscissa data range values, and (iii) displaying the prepared two-dimensional distribution graph on a display screen;

means for arbitrarily designating a coordinate range to be extracted from the two-dimensional distribution graph displayed on the display screen;

means for specifying an ordinate item data range and an abscissa item data range with respect to the designated coordinate range, and for extracting, from the plurality of records stored in the storage means, records having corresponding item data values which coincide with both the specified ordinate item data range and the specified abscissa item data range; and means for displaying a content of each of the extracted records on the display screen.

2. A record extracting apparatus for extracting records from a plurality of records stored in a storage means, each said record comprising a plurality of items, and said record extracting apparatus comprising:

means for designating a desired two items as a first vertical axis item and a first horizontal axis item, respectively, and for designating respective first vertical axis and first horizontal axis data range values;

means for sequentially: (i) reading each record from the storage means, (ii) preparing a first distribution graph in which corresponding coordinate positions in the first distribution graph are plotted based on a data value of each item in the plurality of read out records which corresponds to the respective designated first vertical axis item and first horizontal axis item and which is within the designated first vertical axis and first horizontal axis data range values, and (iii) displaying the prepared first distribution graph on a display screen;

means for arbitrarily designating a first coordinate range to be extracted from the first distribution graph displayed on the display screen;

means for specifying a first vertical axis item data range and a first horizontal item data range with respect to the designated first coordinate range, and for extracting, from the plurality of records stored in the storage means, records having corresponding item data values which coincide with both the specified first vertical axis data range and the specified first horizontal item data range;

means for designating, with respect to each already extracted record, an additional desired two items as a second vertical axis item and a second horizontal axis item, respectively, and for designating respective second vertical axis and second horizontal axis data range values; and means for preparing a second distribution graph in which corresponding coordinate positions in the second distribution graph are plotted based on a data value of each item in each extracted record which corresponds to the respective designated second vertical axis and second horizontal axis items and which is within the second vertical axis and second horizontal axis data range values, and for displaying the prepared second distribution graph.

3. The apparatus according to claim 2, further comprising:

means for arbitrarily designating a second coordinate range to be extracted from the second distribution graph displayed on the display screen; and means for specifying a second vertical axis item data range and a second horizontal item data range with respect to the designated second coordinate range, and for further extracting, from the already extracted records, records having corresponding item data values which coincide with both the specified second vertical axis data range and the specified second horizontal item data range.

* * * * *